United States Patent
Shaw

(10) Patent No.: US 9,506,551 B1
(45) Date of Patent: Nov. 29, 2016

(54) CLUTCH AND GEAR SYNCHRONIZER MODULE

(71) Applicant: BORGWARNER INC., Auburn Hills, MI (US)

(72) Inventor: Wesley L. Shaw, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/829,330

(22) Filed: Aug. 18, 2015

(51) Int. Cl.
| F16H 55/17 | (2006.01) |
| F16H 61/04 | (2006.01) |
| F16D 23/04 | (2006.01) |
| F16D 23/06 | (2006.01) |
| F16D 23/14 | (2006.01) |

(52) U.S. Cl.
CPC .......... *F16H 55/17* (2013.01); *F16H 61/0403* (2013.01); *F16D 23/04* (2013.01); *F16D 23/06* (2013.01); *F16D 23/14* (2013.01); *F16H 2055/178* (2013.01)

(58) Field of Classification Search
None
See application file for complete search history.

(56) References Cited

U.S. PATENT DOCUMENTS

| 2,579,090 | A |   | 12/1951 | Rabe |   |
| 2,771,975 | A |   | 11/1956 | Schmid |   |
| 2,932,373 | A |   | 4/1960 | Schmid |   |
| 3,003,607 | A | * | 10/1961 | Magg | F16D 23/06 192/53.361 |
| 3,200,920 | A |   | 8/1965 | Reich |   |
| 3,504,775 | A |   | 4/1970 | Reich |   |
| 3,688,883 | A |   | 9/1972 | Austen |   |
| 4,712,662 | A | * | 12/1987 | Elverdam | F16D 23/06 192/53.341 |
| 4,830,159 | A | * | 5/1989 | Johnson | F16D 23/06 192/53.32 |
| 5,085,303 | A | * | 2/1992 | Frost | F16D 23/06 192/53.32 |
| 2015/0060222 | A1 |   | 3/2015 | Showalter |   |

FOREIGN PATENT DOCUMENTS

WO  WO 2014/120595 A1  8/2014

* cited by examiner

*Primary Examiner* — Colby M Hansen
(74) *Attorney, Agent, or Firm* — Miller, Matthias & Hull LLP

(57) ABSTRACT

A clutch and gear synchronizer module includes an actuator disposed radially with respect to the transmission shaft and carried by an actuator carrier connected to the transmission shaft for rotation with the transmission shaft. The actuator includes an offset pin coupled to a shift sleeve that is able to move axially with respect to the transmission shaft thereby causing axial and rotational movement of the offset pin and rotation of the actuator about an actuator axis. The actuator includes a lobe and a pawl. Sequentially, the lobe engages a friction ring thereby causing the friction ring to engage the gear and causing the gear to rotate in synchronization with the transmission shaft. As the shift sleeve moves further towards the gear, the pawl then engages clutch teeth disposed on an annular surface of the gear.

15 Claims, 5 Drawing Sheets

CLUTCH AND GEAR SYNCHRONIZER MODULE

BACKGROUND

Technical Field

This disclosure relates to clutches or clutch modules for manual transmissions of automobiles that facilitate synchronization of the rotational speed of the selected gear with the rotational speed of the transmission shaft.

Description of the Related Art

An internal combustion engine of an automobile generates power in the form of reciprocating motion of its pistons. The crankshaft converts this reciprocal motion into rotary motion. The rotary motion of the crankshaft, however, is not transmitted directly to the driving wheels or to the drivetrain because the crankshaft rotates at high rotational speeds, which are inappropriate for starting, stopping and normal travel. Specifically, automobile engines typically operate over a range of about 600 to about 7000 rpm, while the wheels rotate between 0 rpm and about 1800 rpm. It is the function of the transmission to convert the high rotational speed of the crankshaft to a slower wheel speed and to increase torque in the process. While both manual and automatic transmissions provide the same basic functions of speed reduction and torque increase, this disclosure relates to manual transmissions.

Instead of connecting directly to the transmission, the crankshaft connects to a flywheel, which connects to a transmission input shaft, sometimes referred to as a mainshaft. In one example, the transmission selectively couples the input shaft through two gear sets, each providing a gear ratio, and eventually to an output shaft, sometimes referred to as the driveshaft. In many designs, the input shaft fixedly connects to an input pinion that meshes with an input gear fixedly connected to a parallel counter shaft. Thus, the counter shaft rotates with the input shaft, but at a somewhat lower speed to the gear ratio provided by the input pinion and the input gear of the counter shaft. The counter shaft also fixedly connects to a plurality of gears, typically numbered from one to four, five or six. Each of these numbered gears, which rotate with the counter shaft, also mesh with and form gear sets with like-numbered gears through which an output shaft passes. The numbered gears of the output shaft do not connect to the output shaft, but instead ride on bearings. Each pair of enmeshed numbered gears, one on the counter shaft and one on the output shaft, form a gear set and provide a gear ratio. Because the output shaft is not fixedly connected to the numbered gears through which it passes, the transmission also includes a plurality of clutches or clutch modules that selectively couple the output shaft to one of these numbered gears and therefore to one of the gear sets.

Manual transmissions are available in a variety of different designs and clutch modules may be required to connect gear sets to an input shaft, one or more counter shafts or an output shaft. Hence, use of the term "transmission shaft" below may refer to any shaft of a transmission that may be selectively coupled to a gear set by a clutch module.

Before a transmission shaft connects to one of the gears through which it passes, or before a gear shift takes place, it is preferable to have the selected gear rotating at or about the same speed as the transmission shaft to which it will be coupled. This process is known as synchronization. Modern manual transmissions include various means for achieving synchronization of the transmission shaft with the selected gear, or the gear set being shifted to, so the transmission shaft and the selected gear rotate at about the same rotational velocity when the shift takes place. Synchronization may be achieved with synchronizing rings, as disclosed initially in U.S. Pat. No. 2,579,090 and later in U.S. Pat. No. 3,688,883. As shown in U.S. Pat. No. 3,688,883, a synchronization ring may couple to the selected gear or to a clutch body mounted to the selected gear. As gear shifting commences, a shift sleeve, which rotates with the transmission shaft, moves into frictional engagement with the synchronization ring before clutch teeth of the shift sleeve engage clutch teeth of the selected gear. The frictional engagement between the shift sleeve and the synchronization ring imparts rotation to the selected gear. As a result, the transmission shaft (and shift sleeve) and the selected gear rotate at or about the same rotational speed before the shift to the selected gear, or the selected gear set, is completed. Synchronizing rings typically include a conical friction surface, which engages a corresponding conical surface on the selected gear (or clutch body connected to the selected gear). The resulting frictional engagement between the synchronizing ring and the selected gear establishes the desired synchronization between the transmission shaft and the selected gear.

Clutch modules that perform synchronization as well as gear shifting can be complex in design, difficult to assemble and therefore costly to produce. Further, as noted above, multiple clutch modules may be required. Accordingly, a need exists for improved clutch and synchronization modules that are easy to assemble, reliable and cost efficient to produce.

SUMMARY OF THE DISCLOSURE

In one aspect, this document discloses a clutch and gear synchronizer module for transmission that includes a transmission shaft that passes coaxially through a first gear assembly. The transmission shaft may be an input shaft, an output shaft or a counter shaft. The first gear assembly may include or be coupled to a structure that provides a frictional surface and a recess. The transmission shaft is rotatable about a transmission axis. The clutch and gear synchronizer module may include an actuator carrier mounted on the transmission shaft for rotation with the transmission shaft about the transmission axis. The actuator carrier may be disposed radially within and coupled to a shift sleeve for imparting rotation to the shift sleeve while enabling the shift sleeve to move axially with respect to the actuator carrier. The actuator carrier may include an inner hub connected to an outer ring with a window disposed between the inner hub and the outer ring. The clutch and gear synchronizer module may further include a first friction element disposed between the first gear assembly and the actuator carrier. The first friction element may be coupled to the actuator carrier for rotation with the actuator carrier while enabling the first friction element to move axially with respect to the actuator carrier. The clutch and gear synchronizer module may further include an actuator that extends radially between the inner hub and the outer ring and across the window of the actuator carrier. The actuator may be rotatable about an actuator axis that extends radially between the inner hub and the outer ring. The actuator may include a lobe and a pawl disposed in radial alignment with the window. The lobe may also be in radial alignment with the first friction element while the pawl may also be in radial alignment with the frictional surface of the first gear assembly. The actuator may further include an outwardly directed offset pin that is parallel to, but not coaxial with the actuator axis. The offset pin may couple to the shift sleeve.

In another aspect, this document discloses a clutch and gear synchronizer module for a transmission that includes a transmission shaft that passes coaxially through a first gear assembly and a second gear with the clutch and gear synchronizer module disposed between the first and second gears. The first gear assembly may include or be coupled to a structure that provides a circular pattern of clutch teeth and a circular recess that face the clutch and synchronizer module. The second gear may also include a circular pattern of clutch teeth and a circular recess that face the clutch and synchronizer module. The transmission shaft may be rotatable about a transmission axis. The clutch and gear synchronizer module may include an actuator carrier mounted on the transmission shaft for rotation with the transmission shaft. The actuator carrier may be disposed radially within and coupled to a shift sleeve for imparting rotation to the shift sleeve. The clutch and synchronizer module may also include a first friction ring coupled to the actuator carrier and at least partially disposed within the circular recess of the first gear assembly and a second friction ring coupled to the actuator carrier and at least partially disposed within the circular recess of the second gear. The actuator carrier may include an inner hub connected to an outer ring by a pair of struts with a window disposed between the inner hub and the outer ring and between the struts. The clutch and synchronizer module may further include a pair of actuators. Each actuator may include a shaft or main body having an inner end rotatably connected to the inner hub of the actuator carrier and an outer end rotatably connected to the outer ring of the actuator carrier. Each shaft of each actuator may connect to a lobe and a pawl that are disposed in radial alignment with a window. Each lobe may also be in radial alignment with the first and second friction rings. Each pawl may also be in radial alignment with the circular patterns of clutch teeth of the first and second gears. The shafts of the actuators may each be connected to an outwardly directed offset pin that is parallel to, but not coaxial with, its respective shaft. The offset pins may couple to the shift sleeve. An initial movement of the shift sleeve and offset pins towards the first gear assembly causes the lobes to rotate into engagement with the first friction ring and push the first friction ring farther into the circular recess of the first gear assembly, thereby causing the first gear assembly to rotate with the clutch and synchronizer module. Further axial movement of the shift sleeve toward the first gear assembly causes at least one of the pawls to engage the circular pattern of clutch teeth of the first gear assembly. Further, an initial movement of the shift sleeve and offset pins towards the second gear causes the lobes to rotate into engagement with the second friction ring and push the second friction ring into the circular recess of the second gear thereby causing the second gear to rotate with the clutch synchronizer module. In addition, further axial movement of the shift sleeve towards the second gear causes at least one of the pawls to engage the circular pattern of clutch teeth of the second gear.

In another aspect, this document discloses a method for synchronizing a rotational speed of a gear with a rotational speed of a transmission shaft and for transferring torque from the transmission shaft to the gear. The method may include providing a gear that includes or is coupled to a structure that provides an annular surface that includes a circular pattern of clutch teeth and a circular recess. The method may further include providing a clutch and synchronizer module including an actuator carrier disposed radially within and coupled to a shift sleeve. The clutch and synchronizer module may also include a friction ring coupled to the actuator carrier. The actuator carrier may include an inner hub connected to an outer ring with a window disposed between the inner hub and the outer ring. The clutch and synchronizer module may further include an actuator that includes and actuator shaft or main body that extends radially between the inner hub and the outer ring and across the window of the actuator carrier. The actuator shaft may be connected to a lobe and a pawl that are disposed in radial alignment with the window and with the lobe also in radial alignment with the friction ring and the pawl also in radial alignment with the circular pattern of clutch teeth of the gear. The actuator shaft may connect to an outwardly directed offset pin that is parallel to but not coaxial with the actuator shaft. The offset pin may couple to the shift sleeve. The method may further include mounting the clutch and synchronizer module on the transmission shaft for rotation with the transmission shaft. The method may further include passing a transmission shaft through the gear so the gear is disposed adjacent to the clutch and synchronizer module. The method may further include moving the shift sleeve and offset pin towards the gear an initial distance thereby causing the lobe to rotate into engagement with the friction ring and push the friction ring into the circular recess of the gear thereby causing the gear to rotate with the clutch and synchronizer module and the transmission shaft. In addition, the method may include moving the shift sleeve and offset pin further towards the gear to cause the pawl to rotate into engagement with the circular pattern of clutch teeth of the gear.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail in the accompanying drawings, wherein.

The drawings are not necessarily to scale and may illustrate the disclosed embodiments diagrammatically and in partial views. In certain instances, the drawings omit details which are not necessary for an understanding of the disclosed methods and apparatuses or which render other details difficult to perceive. Further, this disclosure is not limited to the particular embodiments illustrated herein.

DESCRIPTION OF THE PRESENTLY PREFERRED EMBODIMENTS

FIGS. 1-6 illustrate a disclosed clutch and gear synchronizer module 20 mounted on a transmission shaft 21 for rotation with the transmission shaft 21. The transmission shaft 21 may be an input shaft, a counter shaft or an output shaft, as will be apparent to those skilled in the art. Typically, the clutch and gear synchronizer module 20 is installed on an input shaft or an output shaft, but those skilled in the art will realize that the clutch and gear synchronizer module 20 may also be installed on a counter shaft in some transmissions. Thus, the transmission shaft 21 may be any one of the shafts of a manual transmission.

Figure 2:
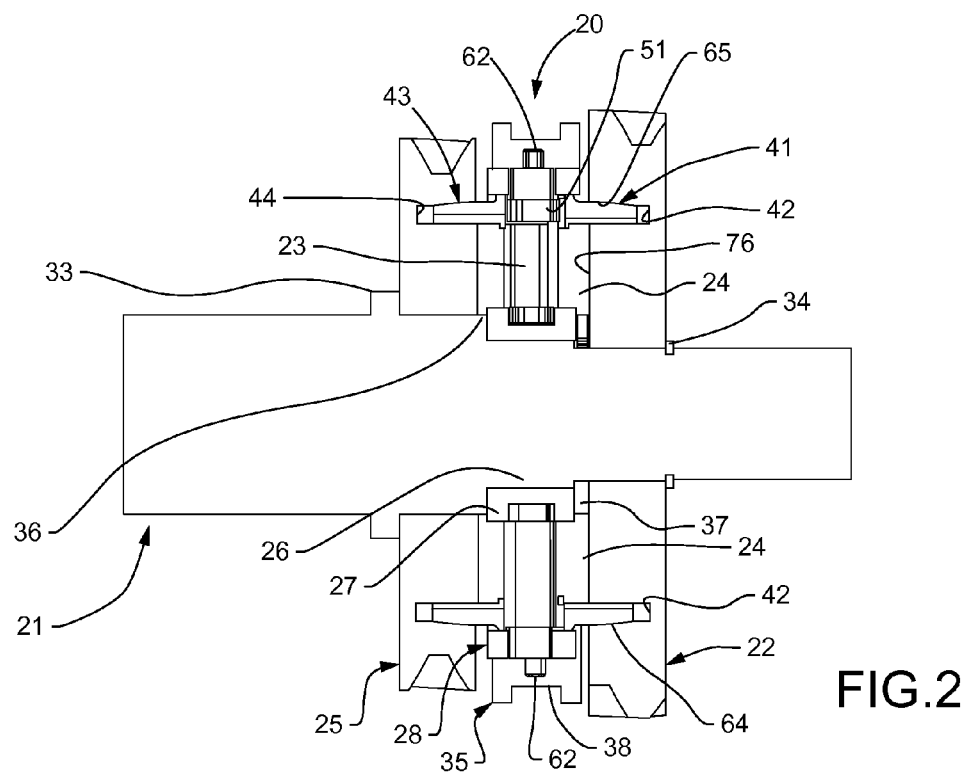
FIG. 2 is another sectional view of the clutch and synchronizer module illustrated in FIG. 1, wherein the shift sleeve has moved to the right so that the friction ring has engaged the gear shown at the right thereby causing the gear to rotate with the clutch and synchronizer module and the transmission shaft.
Figure 3:
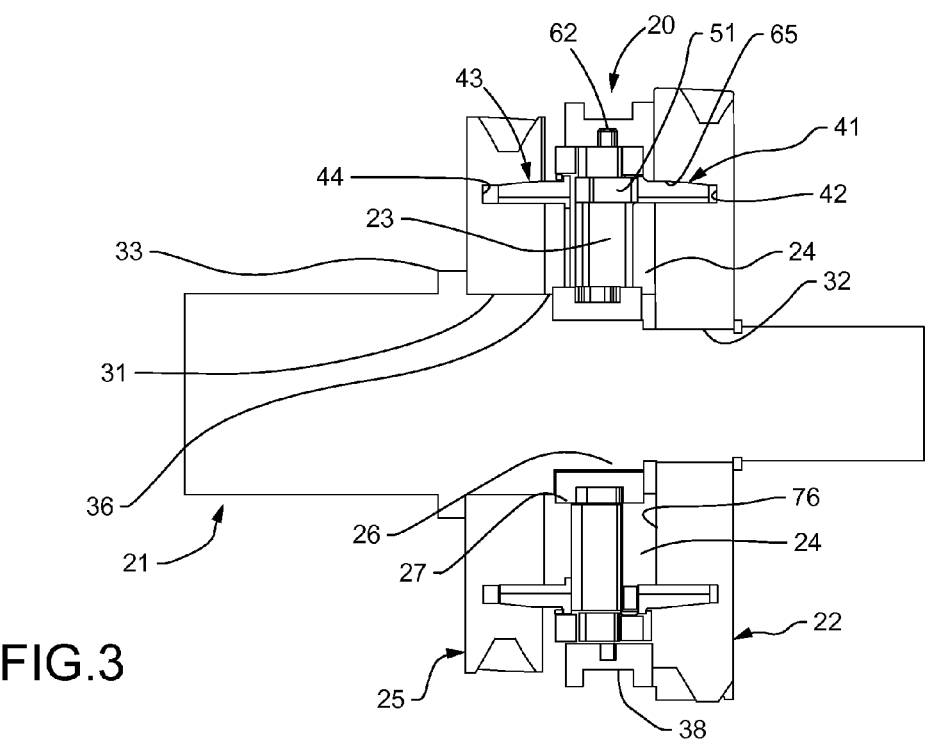
FIG. 3 is another sectional view of the clutch and synchronizer module shown in FIGS. 1 and 2, wherein the shift sleeve has moved further to the right thereby causing the pawls of the actuators to rotate towards the gear shown at the right and just before the pawls fully engage the clutch teeth of the gear shown on the right.
Figure 4:
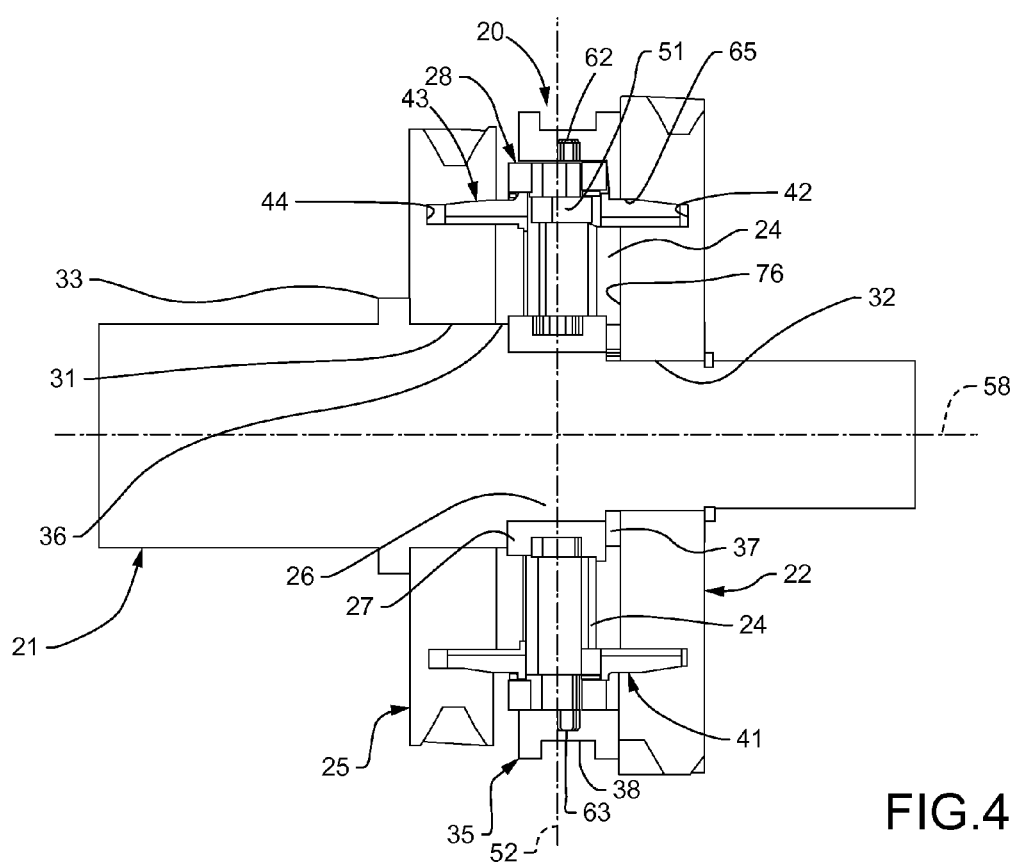
FIG. 4 is yet another sectional view of the clutch and gear synchronizer module shown in FIGS. 1-3, wherein the shift sleeve has moved still further to the right and wherein the pawls of the actuator have rotated into full engagement with the clutch teeth of the gear shown on the right.

FIGS. 1-4 sequentially illustrate the module 20 as the module 20 shifts from a neutral position (FIG. 1) to a position where the selected gear 22 synchronizes with the transmission shaft 21 (FIG. 2) to a position just before the pawls 23 engage the clutch teeth 24 of the selected gear 22 (FIG. 3) to the fully engaged position where the pawls 23 fully engage the clutch teeth 24 of the selected gear 22 (FIG. 4).

Figure 1:
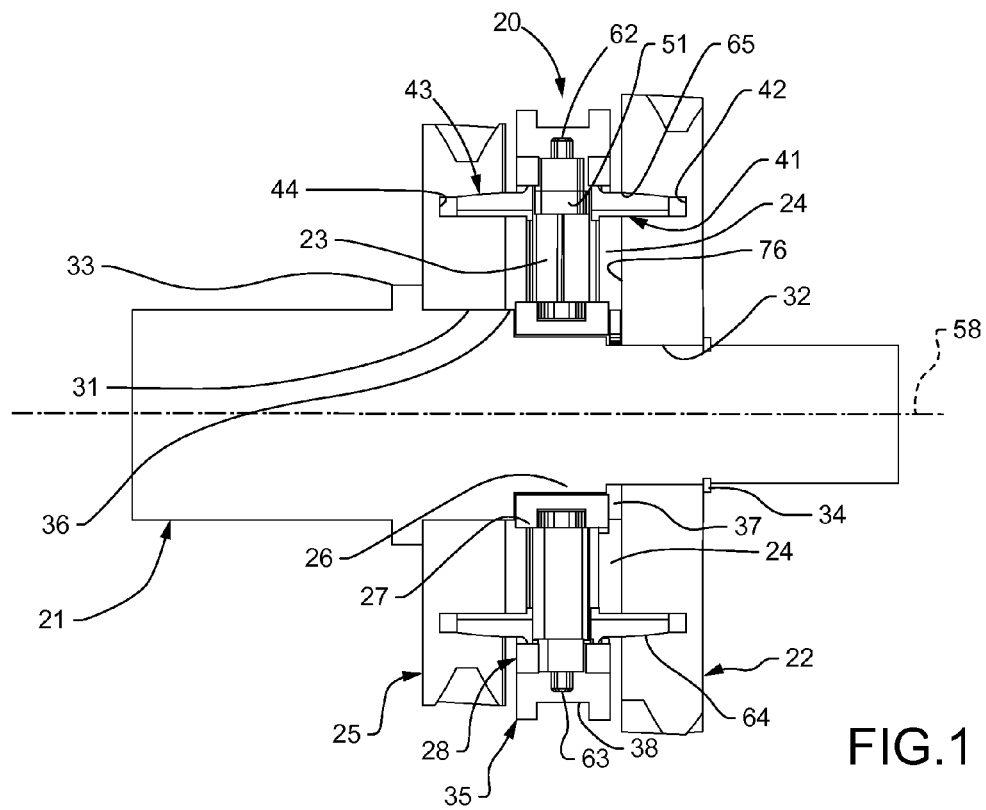
FIG. 1 is a sectional view of a disclosed clutch and gear synchronizer module connected to a transmission shaft for rotation with the transmission shaft and disposed between two gears, through which the transmission shaft passes, and wherein the clutch and synchronizer module is in a neutral position.

Returning to FIG. 1, the transmission shaft 21 may pass through a plurality of gears, including the gear 25 shown at the left in FIGS. 1-4 and the selected gear 22 shown at the right in FIGS. 1-4. The transmission shaft 21 may couple to the module 20 via a splined connection (not shown) between the middle section 26 of the transmission shaft 21 and the inner hub 27 of the actuator carrier 28, which is better illustrated in FIGS. 5-7. Still referring to FIG. 1, the transmission shaft 21 passes through the gears 25, 22 with needle bearings (not shown) disposed between the inner surfaces 31, 32 of the gears 25, 22 and the transmission shaft 21. The transmission shaft 21 may optionally include a flange 33 disposed on one side of the gears 25, 22 and the module 20 with a retainer 34 disposed on the opposite side of the gears 25, 22 and the module 20. The actuator carrier 28 of the module 20 is disposed radially within a shift sleeve 35, which couples to the actuator carrier 28 for rotation with the actuator carrier 28 and the transmission shaft 21. However, the shift sleeve 35 may slide axially to the right or to the left as will be explained below. In contrast, the actuator carrier 28 is maintained in its axial position between the gears 25, 22 by the step 36, retainer 34 and washer 37. The shift sleeve 35 may include a recess 38 at its outer periphery for receiving a shift fork (not shown) or other device for moving the shift sleeve 35 to the right or to the left, or, more specifically, towards the gear 22 or towards the gear 25. The module 20 also includes a friction ring 41 partially received in the recess 42 of the gear 22 when the module 20 is in the neutral position as shown in FIG. 1. Further, the module 20 also includes a friction ring 43 partially received within the recess 44 of the gear 25 when the module 20 is in the neutral position as shown in FIG. 1. FIGS. 5-9 further illustrate various details of the module 20.

Figure 5:
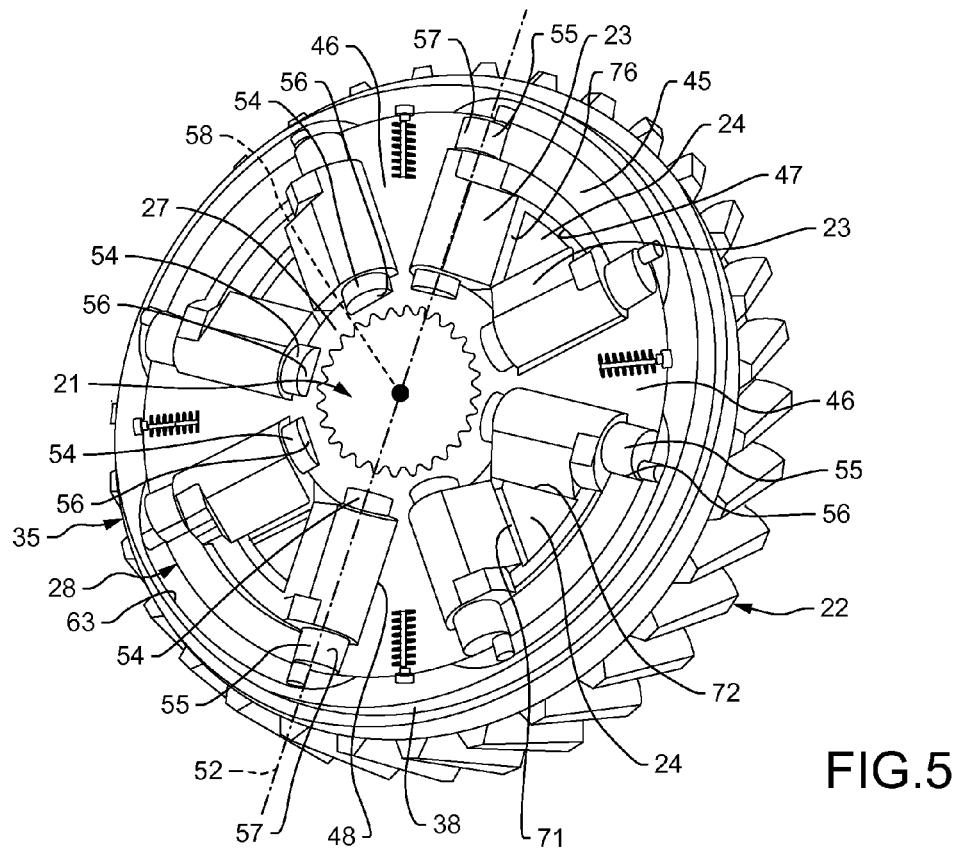
FIG. 5 is a perspective and sectional view of the clutch and gear synchronizer module shown in FIGS. 1-4 with the gear and friction ring shown at the left in FIGS. 1-4 removed entirely and portions of the transmission shaft and shift sleeve removed to show the actuators in their neutral positions.
Figure 6:
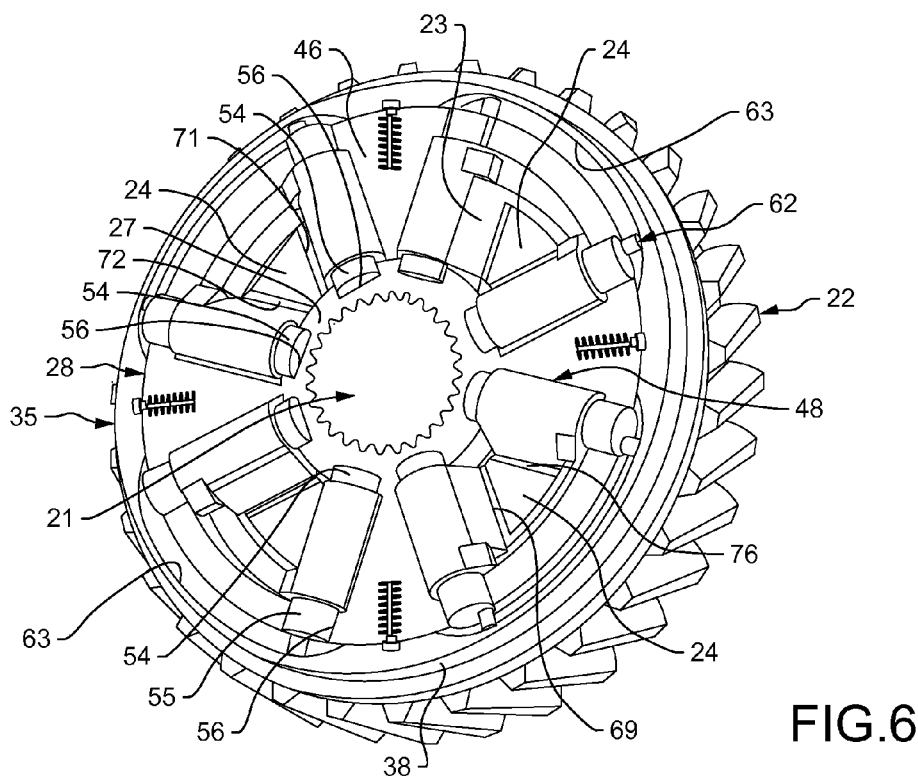
FIG. 6 is another perspective and sectional view of the clutch and gear synchronizer module as shown in FIG. 5, but with the pawls of the actuators rotated into full engagement with the clutch teeth disposed on the gear shown at the right in FIGS. 1-4 and behind the actuator carrier and shift sleeve as shown in FIGS. 5-6.

Turning to FIGS. 5-6, the splined connection couples the inner hub 27 of the actuator carrier 28 to the transmission shaft 21 for rotation with the transmission shaft 21. Other means for connecting the actuator carrier 28 to the transmission shaft 21 for rotation with the transmission shaft 21 will be apparent to those skilled in the art. The inner hub 27 of the actuator carrier 28 connects to an outer ring 45 via one or more struts 46. The actuator carrier 28 includes one or more windows 47 disposed between the inner hub 27 and the outer ring 45 and between pairs of struts 46 as shown in FIGS. 5-6. One or more actuators 48 extend radially across each window 47 and radially between the inner hub 27 and the outer ring 45.

Figures 8, 9:
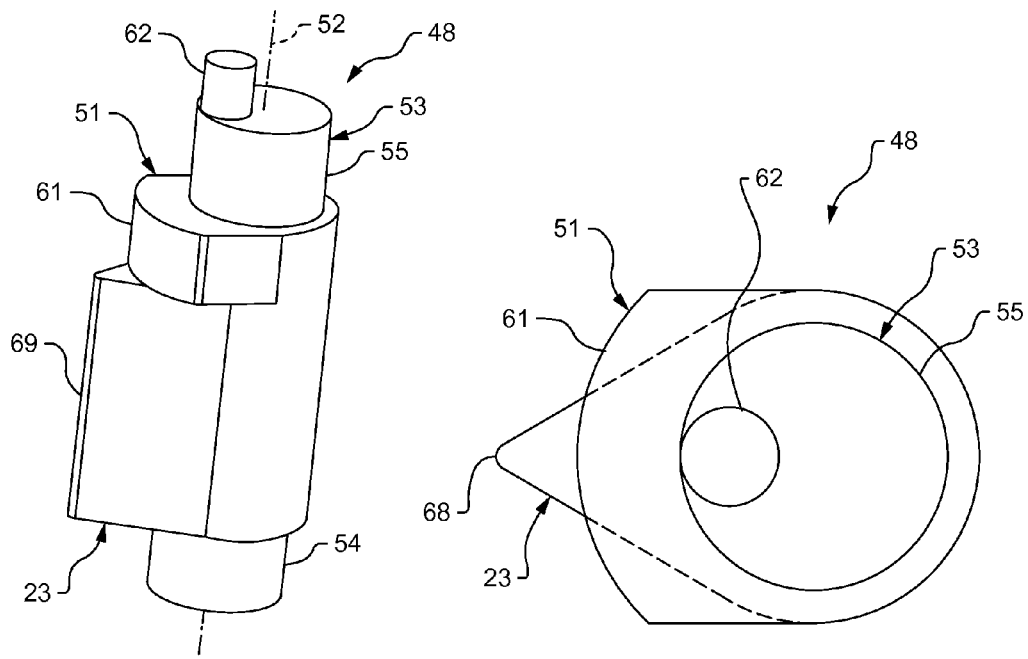
FIG. 8 is a perspective view of a disclosed actuator.
FIG. 9 is a top view of the actuator shown in FIG. 8.

Turning to FIGS. 8-9, an actuator 48 may include or be connected to a pawl 23 as well as a lobe 51, both of which extend radially outwardly from an actuator axis 52. In the embodiment shown in FIGS. 8-9, the actuator 48 may include an actuator shaft 53 (or main body) that may include an inner end 54 and an outer end 55. As shown in FIGS. 5-6, the inner hub 27 of the actuator carrier 28 includes inner recesses 56 that rotatably receive the inner ends 54 of the actuators 48. Similarly, the outer ring 45 of the actuator carrier 28 includes a plurality of through holes 57 that rotatably receive the outer ends 55 of the actuators 48. Thus, as shown in FIGS. 5-6 the actuators 48 extend radially between the inner hub 27 and outer ring 45 of the actuator carrier 28. Further, the actuators 48 may rotate about their actuator axes 52, which are perpendicular to the transmission shaft axis 58 (see also FIG. 1).

As shown in FIGS. 8-9, each actuator 48 includes a lobe 51 that extends radially outwardly from the actuator axis 52 or the actuator shaft 53. The lobe 51 terminates at blunt engagement surface 61, which engages the friction ring 41 and pushes the friction ring 41 into the recess 42 of the gear 22 when the shift sleeve 35 moves to the right in FIGS. 1-4. Further, the blunt engagement surface 61 engages the friction ring 43 and pushes the friction ring 43 into the recess 44 of the gear 25 when the shift sleeve 35 moves to the left in FIGS. 1-4. The actuators 48 each include an offset pin 62 that is received in a recess 63 disposed in the shift sleeve 35 (see FIG. 1), which enables the rotational movement of the lobe 51 into engagement with either the friction ring 41 or the friction ring 43. Because the offset pin 62 is not coaxial with the actuator axis 52, movement of the shift sleeve 35 in an axial direction either to the right or to the left in FIG. 1 causes the actuator 48 to rotate about the actuator axis 52. When the shift sleeve 35 moves to the right in FIG. 1, the actuator 48 rotates to the right so that the blunt engagement surface 61 of the lobe 51 engages the friction ring 41 and pushes the friction ring 41 into the recess 42 of the gear 22 as shown in FIG. 2.

In FIG. 2, the lobes 51 have pushed the friction ring 41 into the recess 42 of the gear 22 to an extent where the outer conical surface 64 of the friction ring 41 is in frictional contact with a conical surface 65 of the recess 42. In the position shown in FIG. 2, the frictional engagement between the outer conical surface 64 and the conical surface 65 causes the gear 22 to rotate with the transmission shaft 21 and the actuator carrier 28 and therefore synchronizes the gear 22 with the transmission shaft 21. The synchronizing of the rotational speeds of the gear 22 and transmission shaft 21 (FIG. 2) occurs prior to engagement of the pawls 23 of the actuators 48 with the clutch teeth 24 disposed on the gear 22 (FIG. 4).

Figure 7:
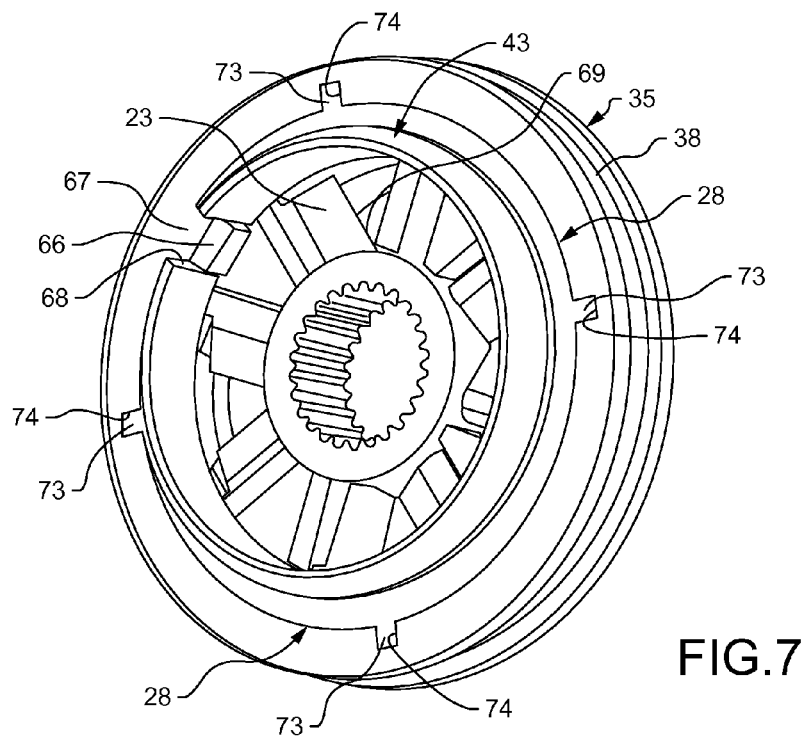
FIG. 7 is a perspective view of the clutch and gear synchronizer module shown in FIGS. 1-6.

The friction rings 41, 43 also rotate with the actuator carrier 28 and the transmission shaft 21 due to the connection between the friction rings 41, 43 and the actuator carrier 28 as illustrated in FIG. 7. Referring to FIG. 7, the actuator carrier 28 includes a lug 66. Further, the friction ring 43, which may be identical in construction to the friction ring 41, is a split ring with two free ends 67, 68. The friction ring 41 is held in place by the recess 44 as shown in FIG. 1 and the engagement between the lug 66 and the free ends 67, 68 of the friction ring 43 enable the friction ring 43 to rotate in either direction with the actuator carrier 28. An identical lug (not shown) couples the friction ring 41 for rotation with the actuator carrier 28 as well.

Returning to FIG. 8, each actuator 48 includes a pawl 23, which, like the lobe 51, extends radially outwardly from the actuator axis 52 or the actuator shaft 53. In the embodiment shown in FIGS. 8-9, the pawl 23 extends radially outwardly and terminates at an acute edge 69. The acute edge 69 of the pawl 23 of the actuator 48 engages one side of a clutch tooth 24 as shown in FIG. 6. FIG. 6 is an illustration of a full engagement between the actuators 48 and the clutch teeth 24. FIG. 4 also illustrates this fully engaged position. FIG. 5 illustrates the actuators 48 in their neutral position, also shown in FIG. 1. FIG. 3, in contrast, shows the actuators 48 in a position just prior to full engagement of the pawls 23 with the clutch teeth 24.

Returning to FIG. 2, during synchronization of the gear 22 with the transmission shaft 21, the friction ring 41 has expanded due to the frictional contact between the outer conical surface 64 of the friction ring 41 and the conical surface 65 of the recess 42 of the gear 22. This causes the friction ring 41 to expand and prevents further rotation of the actuators 48 until synchronization is complete. After synchronization is complete, the friction ring 41 shrinks and can be pushed farther into the recess 42 to the position shown in FIGS. 3 and 4. FIGS. 3 and 4 illustrate the friction ring 41 at its deepest position within the recess 42 and the size of the lobe 51 prevents any further biasing or pushing of the friction ring 41 into the recess 42. As the actuator 48 rotates further, the pawls 23 of the actuator 48 then engage the clutch teeth 24 of the gear 22. Thus, in FIG. 4, the module 20 fully engages the gear 22 and both rotation and torque is transmitted from the transmission shaft 21 to the gear 22.

Returning to FIGS. 5-6, each window 47 may include two actuators 48 with the pawls 23 disposed in opposing directions. Further, the clutch teeth 24 may include angled side edges 71, 72 for engaging oppositely directed pawls 23 of two actuators 48 disposed at opposite ends of a window 47. FIGS. 5-6 also illustrate the recesses 63 that accommodate the offset pins 62 of two actuators 48 disposed at opposite ends of a window 47. FIG. 7 illustrates a coupling between the actuator carrier 28 and the shift sleeve 35. Specifically, the actuator carrier 28 may include a plurality of radially outwardly extending tongues 73 that are each accommodated in an axially extending groove 74 thereby providing a tongue-in-groove connection with permits movement of the shift sleeve 35 along the transmission shaft axis 58 while the shift sleeve 35 rotates with the actuator carrier 28.

Figure 10:
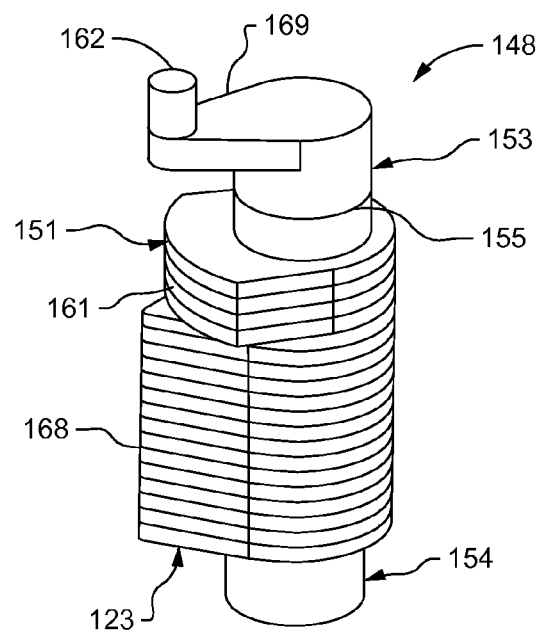
FIG. 10 is a perspective view of an alternative actuator.
Figure 11:
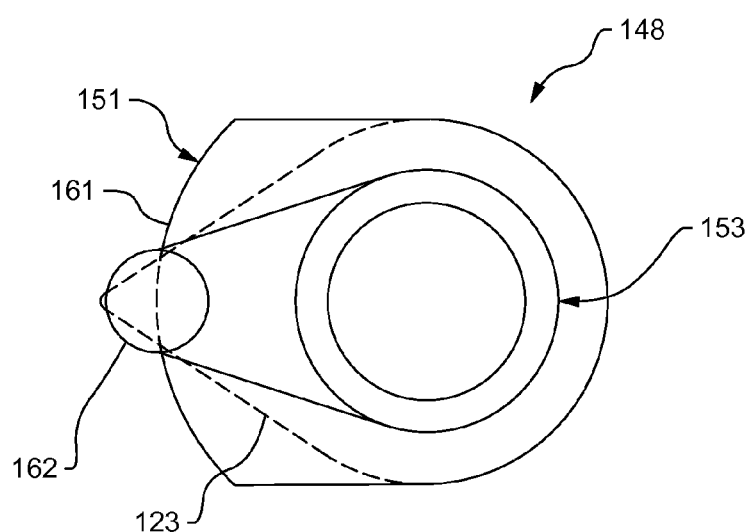
FIG. 11 is a top view of the actuator shown in FIG. 10.

FIGS. 10-11 illustrate an alternative actuator 148 wherein the offset pin 162 is disposed on a lever 169 that extends outward from the shaft 153 or outward from the outer end 155 of the shaft 153. The shaft 153 also includes an inner end 154 and the actuator 148, like the actuator 48 shown in FIGS. 8-9, includes a lobe 151 and a pawl 123. The lobe 151 includes a blunt engagement surface 161 and the pawl 123 includes an acute edge 168, similar to the actuator 48 shown in FIGS. 8-9.

INDUSTRIAL APPLICABILITY

The disclosed clutch and gear synchronizer module 20 includes one or more actuators 48 that extend radially outward from the transmission shaft axis 58 or radially between the inner hub 27 and the outer ring 45 of the actuator carrier 28. While the actuators 48 are disposed radially with respect to the transmission shaft 21, they rotate about an actuator axis 52 that is perpendicular to the transmission shaft axis 58. The actuators 48 may include a shaft 53 or similar structure that provides an inner end 54 that may be received in an inner recess 56 disposed in the inner hub 27 of the actuator carrier 28. The actuator 48 may further include an outer end 55 that may be received in an through hole 57 disposed in the outer ring 45 of the actuator carrier 28. This rotatable connection between the actuators 48 and the actuator carrier 28 provides for a reliable connection between the actuator 48 and the actuator carrier 28 that is also easy to assemble. Employment of offset pins 62 that are securely coupled to the shift sleeve 35 enables the lateral or axial movement of the shift sleeve 35 along the transmission shaft axis 58 to cause the actuators 48 to rotate about their actuator axes 52, which results in the lobes 51 engaging the friction ring 41 when the shift sleeve 35 is shifted to the right in FIGS. 1-4 or the lobe 51 engaging the friction ring 43 when the shift sleeve 35 is shifted to the left in FIGS. 1-4. The arrangement of the friction rings 41, 43 in the recesses 42, 44 of the gears 22, 25 respectively enables the synchronizing function illustrated in FIG. 2 to occur prior to the engagement of the pawls 23 with the clutch teeth 24. The disclosed clutch and gear synchronizer module 20 is easy to assembly and install between two gears 25, 22.

A method for synchronizing a rotational speed of the gear 22 with the rotational speed of a transmission shaft 21 and for transferring torque from the transmission shaft 21 to the gear 22 may include the following steps. First, the gear 22 includes an annular surface 76 that includes a circular pattern of clutch teeth 24 as illustrated in FIGS. 1-6. The method may further include providing a clutch and gear synchronizer module 20 that includes an actuator carrier 28 disposed radially within and coupled to a shift sleeve 35. The module 20 may also include a friction ring 41 or other suitable friction element coupled to the actuator carrier 28 for rotation with the actuator carrier 28. The actuator carrier 28 may include an inner hub 27 connected to an outer ring 45 with a window 47 disposed between the inner hub 27 and the outer ring 45. The module 20 may further include an actuator 48 that extends radially between the inner hub 27 and the outer ring 45 and across the window 47. The actuator 48 may include a lobe 51 and a pawl 23 disposed in radial alignment with the window 47 and with the lobe 51 also in radial alignment with the friction ring 41 and with the pawl 23 in radial alignment with the circular pattern of clutch teeth 24 of the gear 22. The actuator 48 may further include an outwardly directed offset pin 62 that is parallel to but not coaxial with the actuator axis 52. The offset pin 62 may couple to the shift sleeve 35 so that axial movement of the shift sleeve 35 causes rotation of the actuator 48.

The method may further include mounting the module 20 on the transmission shaft 21 for rotation with the transmission shaft 21. The method may further include passing the transmission shaft 21 through the gear 22 so the gear 22 is disposed adjacent to the module 20. The method may further include moving shift sleeve 35 and offset pin 62 towards the gear 22 an initial distance thereby causing the lobe 51 to rotate into engagement with the friction ring 41 and push the friction ring 41 into the circular recess 42 of the gear 22 (see FIG. 2) thereby causing the gear 22 to rotate with the module 20 and the transmission shaft 21. The method may further include moving the shift sleeve 35 and offset pin 62 further towards the gear 22 thereby causing the pawl 23 to rotate into engagement with the circular pattern of clutch teeth 24 of the gear 22 for full engagement between the gear 22 and the module 20 and the transmission shaft 21 (See FIG. 4).

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A clutch and gear synchronizer module for a transmission that includes a transmission shaft that passes coaxially through a first gear assembly, the first gear assembly including a frictional surface and a recess, the transmission shaft being rotatable about a transmission axis, the clutch and gear synchronizer module comprising:
an actuator carrier mounted on the transmission shaft for rotation with the transmission shaft about the transmission axis, the actuator carrier disposed radially within and coupled to a shift sleeve for imparting rotation to the shift sleeve while enabling the shift sleeve to move axially with respect to the actuator carrier, the actuator carrier including an inner hub connected to an outer ring with a window disposed between the inner hub and the outer ring,
a first friction element disposed between the first gear assembly and the actuator carrier and coupled to the actuator carrier for rotation with the actuator carrier while enabling the first friction element to move axially with respect to the actuator carrier, and
an actuator that extends radially between the inner hub and the outer ring and across the window of the actuator carrier, the actuator being rotatable about an actuator axis that extends radially between the inner hub and the outer ring, the actuator including a lobe and a pawl disposed in radial alignment with the window, the lobe also in radial alignment with the first friction element, the pawl also in radial alignment the frictional surface of the first gear assembly, the actuator further including an outwardly directed offset pin that is parallel to but not coaxial with the actuator axis, the offset pin coupled to the shift sleeve.

2. The clutch and gear synchronizer of claim 1 wherein an initial axial movement of the shift sleeve and offset pin towards the first gear assembly causes the lobe to rotate into engagement with the first friction element and push the first friction element into the recess of the first gear assembly thereby causing the first gear assembly to rotate with the clutch and synchronizer module and wherein a further axial movement of the shift sleeve towards the first gear assembly causes the pawl to engage the frictional surface of the first gear assembly.

3. The clutch and gear synchronizer of claim 1 wherein the transmission further includes a second gear through which the transmission shaft passes and disposed opposite the clutch and synchronizer module from the first gear assembly, the second gear including a recess and a frictional surface that face the clutch and synchronizer module,
the clutch and synchronizer module further including a second friction element disposed between the second gear and the actuator carrier and coupled to the actuator carrier for rotation with the actuator carrier while enabling the second friction element to move axially with respect to the actuator carrier,
the lobe also in radial alignment with the second friction element, the pawl also in radial alignment the frictional surface of the second gear,
wherein an initial axial movement of the shift sleeve and offset pin towards the second gear causes the lobe to rotate into engagement with the second friction element and push the second friction element into the recess of the second gear thereby causing the second gear to rotate with the clutch and synchronizer module and wherein a further axial movement of the shift sleeve towards the second gear causes the pawl to engage the frictional surface of the second gear.

4. The clutch and gear synchronizer of claim 3 wherein the first and second friction elements are split rings with two free ends, and wherein the recesses of the first and second gears are circular and coaxial with the transmission shaft, the recesses of the first and second gears also including an abutment for engaging the free ends of the first and second frictional elements respectively.

5. The clutch and gear synchronizer of claim 4 wherein the first and second friction elements each include a conical outer peripheral surface and the recesses of the first and second gears each include a conical surface for frictionally engaging the conical outer peripheral surfaces of the first and second friction elements respectively for synchronization of the first and second gears with the clutch and synchronizer module respectively.

6. The clutch and gear synchronizer of claim 1 wherein the actuator includes an actuator shaft that is coaxial with the actuator axis, the shaft having an inner end rotatably received in an inner recess disposed on the inner hub of the actuator carrier, the actuator shaft having an outer end rotatably received in an outer through hole disposed in the outer ring of the actuator carrier, the lobe and pawl connected to the actuator shaft and extending radially outward from the actuator shaft.

7. The clutch and gear synchronizer of claim 6 wherein the offset pin is disposed between the outer ring of the actuator carrier and the shift sleeve and is coupled to the shift sleeve for rotational movement of the shift sleeve with the transmission shaft and for axial movement of the shift sleeve towards and away from the first gear assembly.

8. The clutch and gear synchronizer of claim 1 wherein the actuator axis is perpendicular to the transmission axis and extends radially outwardly from the transmission axis.

9. The clutch and gear synchronizer of claim 1 wherein the actuator carrier includes a plurality of windows and a plurality of actuators, each actuator extending radially between the inner hub and the outer ring and across one of the windows of the actuator carrier.

10. The clutch and gear synchronizer of claim 1 wherein the clutch and synchronizer module includes a pair of actuators, each actuator extending across the window with the pawls directed towards each other.

11. The clutch and gear synchronizer of claim 1 wherein the actuator includes an actuator shaft disposed along the actuator axis, the actuator shaft being connected to the pawl and the lobe, the pawl being wedge-shaped and extending radially away from the actuator shaft before terminating at an acute edge, and the lobe extending radially away from the actuator shaft before terminating at a blunt engagement surface, the acute edge of the pawl disposed farther from the actuator axis than the blunt engagement surface of the lobe.

12. The clutch and gear synchronizer of claim 1 wherein the outer ring of the actuator carrier and the shift sleeve are coupled together by a tongue and groove connection.

13. A clutch and gear synchronizer module for a transmission that includes a transmission shaft that passes coaxially through a first gear assembly and a second gear with the clutch and gear synchronizer module disposed between the first gear assembly and the second gear, the first gear assembly including a circular pattern of clutch teeth and a circular recess that face the clutch and synchronizer module, the second gear including a circular pattern of clutch teeth and a circular recess that face the clutch and synchronizer module, the transmission shaft being rotatable about a transmission axis, the clutch and gear synchronizer module comprising:

an actuator carrier mounted on the transmission shaft for rotation with the transmission shaft, the actuator carrier disposed radially within a shift sleeve, the clutch and synchronizer module also including a first friction ring coupled to the actuator carrier and at least partially disposed within the circular recess of the first gear assembly and a second friction ring coupled to the actuator carrier and at least partially disposed in the circular recess of the second gear, the actuator carrier including an inner hub connected to an outer ring by a pair of struts with a window disposed between the inner hub and the outer ring and between the struts, the clutch and synchronizer module further including a pair of actuators, each actuator including a shaft having an inner end rotatably connected to the inner hub of the actuator carrier and an outer end rotatably connected to the outer ring of the actuator carrier, each shaft of each actuator connected to a lobe and a pawl that are disposed in radial alignment with the window, each lobe also in radial alignment with the first and second friction rings, each pawl also in radial alignment with the circular patterns of clutch teeth of the of the first and second gears, each shaft of each actuator being connected to an outwardly directed offset pin that is parallel to but not coaxial with each shaft of each respective actuator, the offset pins coupled to the shift sleeve, wherein an initial axial movement of the shift sleeve and offset pins towards the first gear assembly causes the lobes to rotate into engagement with the first friction ring and push the first friction ring into the circular recess of the first gear assembly thereby causing the first gear assembly to rotate with the clutch and synchronizer module and wherein a further axial movement of the shift sleeve towards the first gear assembly causes at least one of the pawls to engage the circular pattern of clutch teeth of the first gear assembly, and wherein an initial axial movement of the shift sleeve and offset pins towards the second gear causes the lobes to rotate into engagement with the second friction ring and push the second friction ring into the circular recess of the second gear thereby causing the second gear to rotate with the clutch and synchronizer module and wherein a further axial movement of the shift sleeve towards the second gear causes at least one of the pawls to engage the circular pattern of clutch teeth of the second gear.

14. The clutch and gear synchronizer of claim 13 wherein the inner hub includes a pair of inner recesses and the outer ring includes a pair of through holes, the inner ends of each shaft of each actuator being rotatably received in one inner recess of the of inner recesses of the inner hub and the outer ends of each shaft of each actuator being rotatably received in one through hole of the pair of through holes of the outer ring.

15. A method for synchronizing a rotational speed of a gear with a rotational speed of a transmission shaft and for transferring torque from the transmission shaft to the gear, the method comprising:

providing the gear with an annular surface that includes a circular pattern of clutch teeth and a circular recess, providing a clutch and synchronizer module including an actuator carrier disposed radially within and coupled to a shift sleeve, the clutch and synchronizer module also including a friction ring coupled to the actuator carrier, the actuator carrier including an inner hub connected to an outer ring with a window disposed between the inner hub and the outer ring, the clutch and synchronizer module further including an actuator that includes an actuator shaft that extends radially between the inner hub and the outer ring and across the window of the actuator carrier, the actuator shaft connected to a lobe and a pawl disposed in radial alignment with the window with the lobe also in radial alignment with the friction ring and the pawl also in radial alignment with the circular pattern of clutch teeth of the gear, the actuator shaft connected to an outwardly directed offset pin that is parallel to but not coaxial with the actuator shaft, the offset pin coupled to the shift sleeve, mounting the clutch and synchronizer module on the transmission shaft for rotation with the transmission shaft, passing the transmission shaft through the gear so the gear is disposed adjacent to the clutch and synchronizer module, configuring the shift sleeve and offset pin such that moving the shift sleeve and offset pin towards the gear an initial distance thereby causing the lobe to rotate into engagement with the friction ring and push the friction ring into the circular recess of the gear thereby causing the gear to rotate with the clutch and synchronizer module and the transmission shaft, and configuring the shift sleeve and offset pin such that moving the shift sleeve and offset pin further towards the gear causes the pawl to rotate into engagement with the circular pattern of clutch teeth of the gear.

* * * * *